United States Patent
Zhang et al.

(10) Patent No.: US 10,565,582 B2
(45) Date of Patent: Feb. 18, 2020

(54) METHOD AND APPARATUS FOR SERVICE AUTHENTICATION

(71) Applicant: Alibaba Group Holding Limited, Grand Cayman (KY)

(72) Inventors: Yongzhi Zhang, Hangzhou (CN); Lingnan Shen, Hangzhou (CN); Lei Wang, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 585 days.

(21) Appl. No.: 15/228,383

(22) Filed: Aug. 4, 2016

(65) Prior Publication Data

US 2017/0039546 A1 Feb. 9, 2017

(30) Foreign Application Priority Data

Aug. 5, 2015 (CN) .......................... 2015 1 0475791

(51) Int. Cl.
*G06Q 20/32* (2012.01)
*G06Q 20/38* (2012.01)
(Continued)

(52) U.S. Cl.
CPC ......... *G06Q 20/3278* (2013.01); *G06Q 20/20* (2013.01); *G06Q 20/206* (2013.01);
(Continued)

(58) Field of Classification Search
None
See application file for complete search history.

(56) References Cited

U.S. PATENT DOCUMENTS 8,533,123 B2  9/2013  Hart
8,620,299 B2  12/2013 Kumar
(Continued)

FOREIGN PATENT DOCUMENTS

EP  1349031 A1  1/2003
JP  2002056330 A  2/2002
(Continued)

OTHER PUBLICATIONS

International Search Report and Written Opinion to corresponding International Application No. PCT/US2016/045678 dated Oct. 20, 2016 (11 pages).

(Continued)

*Primary Examiner* — Christle I Marshall
(74) *Attorney, Agent, or Firm* — James J. DeCarlo; Greenberg Traurig, LLP (57) ABSTRACT

An apparatus and method allowing authentication of a service using a service initiating terminal and a service authorization terminal. The method includes sending, by the service initiating terminal, service information to the service authorization terminal, receiving, by the service initiating terminal, a service authorization code corresponding to the service information sent by the service authorization terminal. The method also includes generating, by the service initiating terminal, service authentication information according to the service information and the service authorization code, and uploading the service authentication information to a server for processing the service after authenticating the service authorization code.

30 Claims, 4 Drawing Sheets

(51) Int. Cl.

| | | |
|---|---|---|
| *H04W 12/06* | (2009.01) | |
| *G06Q 20/40* | (2012.01) | |
| *H04L 29/06* | (2006.01) | |
| *H04W 12/10* | (2009.01) | |
| *H04W 4/80* | (2018.01) | |
| *G06Q 20/20* | (2012.01) | |
| *H04L 9/32* | (2006.01) | |
| *H04L 9/08* | (2006.01) | |
| *H04W 12/08* | (2009.01) | |

(52) U.S. Cl.
CPC ............ *G06Q 20/32* (2013.01); *G06Q 20/38* (2013.01); *G06Q 20/4014* (2013.01); *H04L 9/0866* (2013.01); *H04L 9/321* (2013.01); *H04L 9/3228* (2013.01); *H04L 9/3247* (2013.01); *H04L 9/3297* (2013.01); *H04L 63/0853* (2013.01); *H04L 63/0884* (2013.01); *H04L 63/123* (2013.01); *H04W 4/80* (2018.02); *H04W 12/06* (2013.01); *H04W 12/0804* (2019.01); *H04W 12/10* (2013.01); *H04W 12/1006* (2019.01); *G06F 2221/2115* (2013.01); *H04L 63/083* (2013.01); *H04L 63/0861* (2013.01); *H04L 2209/56* (2013.01)

(56) References Cited

U.S. PATENT DOCUMENTS

| | | | |
|---|---|---|---|
| 8,744,974 B2* | 6/2014 | White | G06Q 20/20 705/66 |
| 8,818,867 B2 | 8/2014 | Baldwin et al. | |
| 8,930,274 B1 | 1/2015 | Lee et al. | |
| 9,038,142 B2 | 5/2015 | Vongsouvanh et al. | |
| 9,280,772 B2 | 3/2016 | Baldwin et al. | |
| 9,386,005 B2 | 7/2016 | Huang | |
| 2007/0209064 A1 | 9/2007 | Qin et al. | |
| 2008/0294556 A1 | 11/2008 | Anderson | |
| 2009/0144161 A1* | 6/2009 | Fisher | H04W 4/21 705/16 |
| 2009/0307139 A1 | 12/2009 | Mardikar et al. | |
| 2012/0116887 A1 | 5/2012 | Norair | |
| 2013/0041776 A1 | 2/2013 | Schunemann | |
| 2013/0179281 A1* | 7/2013 | White | G06Q 20/382 705/21 |
| 2013/0179352 A1* | 7/2013 | Dwyre | G06Q 20/20 705/71 |
| 2013/0185214 A1* | 7/2013 | Azen | G06Q 20/206 705/76 |
| 2013/0238503 A1* | 9/2013 | Patel | G06Q 20/385 705/44 |
| 2013/0246202 A1* | 9/2013 | Tobin | G06Q 20/20 705/18 |
| 2013/0333008 A1 | 12/2013 | Tapling et al. | |
| 2014/0041000 A1 | 2/2014 | Rolfe | |
| 2014/0074473 A1 | 3/2014 | Kamat | |
| 2014/0101036 A1* | 4/2014 | Phillips | G06Q 20/027 705/39 |
| 2014/0189799 A1 | 7/2014 | Lu | |
| 2015/0006386 A1* | 1/2015 | Tebbe | G06Q 20/3274 705/44 |
| 2015/0249659 A1 | 9/2015 | Vongsouvanh et al. | |
| 2016/0099941 A1 | 4/2016 | Hein | |
| 2016/0196544 A1 | 7/2016 | Norair | |
| 2017/0286949 A1* | 10/2017 | Gurunathan | G06Q 20/14 |

FOREIGN PATENT DOCUMENTS

| | | |
|---|---|---|
| JP | 2013529326 A | 7/2013 |
| JP | 2017-505469 A | 2/2017 |
| KR | 10-2012-0071982 | 7/2012 |
| KR | 10-2014-0124670 | 10/2014 |

OTHER PUBLICATIONS

Extended European Search Report to corresponding EP Application No. 16833906.7 dated Jan. 21, 2019 (8 pages).

* cited by examiner

METHOD AND APPARATUS FOR SERVICE AUTHENTICATION

CROSS-REFERENCE TO RELATED APPLICATIONS

This application claims the benefit of priority from Chinese Patent Application No. 201510475791.8, filed on Aug. 5, 2015, entitled "Method and Apparatus for Service Verification," which is incorporated herein by reference in its entirety.

BACKGROUND

Field of the Disclosure

The present disclosure generally relates to service authentication, and particularly relates to authentication of a service using a service initiating terminal and a service authorization terminal.

Description of the Related Art

With the development of mobile devices and NFC (Near Field Communication) technologies, the popularization rate of the NFC function in mobile devices is increasingly high. The NFC technologies generally may serve as an offline payment channel. Therefore, the increasing popularization of the NFC function in mobile devices undoubtedly promotes the development of mobile Internet.

In the process of offline payment, a user may simulate, on a mobile device, a medium of payment (for example, a bank card or an E-wallet and so on) by means of a specific application program, and then interact with a merchant's terminal (for example, a POS machine) by means of the NFC function to finish the payment process. However, in a traditional implementation, payment is a service with higher security. Therefore, in order to shield a potential risk in the payment process, generally a trusted environment needs to be simulated for the user's terminal and the merchant's terminal, which will not benefit the advancement and progressive development of mobile payment.

BRIEF SUMMARY

One aspect of the disclosure is drawn to a method for authentication of a service using a service initiating terminal and a service authorization terminal. The method includes sending, by the service initiating terminal, service information to the service authorization terminal, receiving, by the service initiating terminal, a service authorization code corresponding to the service information sent by the service authorization terminal, the service authorization code being computed by the service authorization terminal based on the service information and user information, and generating, by the service initiating terminal, service authentication information according to the service information and the service authorization code, and uploading the service authentication information to a server for processing the service after authenticating the service authorization code.

One aspect of the disclosure is drawn to a method for authentication of a service using a service initiating terminal and a service authorization terminal. The method includes receiving, by the service authorization terminal, service information sent by the service initiating terminal, generating, by the service authorization terminal, a corresponding service authorization code using the service information and user information according to a preset algorithm, and sending, by the service authorization terminal, the service authorization code to the service initiating terminal. The service authentication code allows the service initiating terminal to generate service authentication information according to the service information and the service authorization code, and upload the service authentication information to a server for processing the service after authenticating the service authorization code.

One aspect of the disclosure is drawn to an apparatus for authentication of a service using a service authorization terminal. The apparatus includes a processor and a non-transitory memory storing computer-executable instructions. When executed by the processor, the instructions cause the apparatus to send generated service information to the service authorization terminal, receive a service authorization code corresponding to the service information sent by the service authorization terminal, wherein the service authorization code is generated by the service authorization terminal by means of computation based on the service information and user information, and generate service authentication information according to the service information and the service authorization code, and upload the service authentication information to a server for processing the service after authenticating the service authorization code.

One aspect of the disclosure is drawn to an apparatus for authentication of a service using a service initiating terminal. The apparatus includes a processor and a non-transitory memory storing computer-executable instructions. When executed by the processor, the instructions cause the apparatus to receive service information sent by the service initiating terminal, generate a corresponding service authorization code using the service information and user information according to a preset algorithm, and send the service authorization code to the service initiating terminal via a near field communication (NFC) module, the service authorization code allowing the service initiating terminal to generate service authentication information according to the service information and the service authorization code, and upload the service authentication information to a server for processing the service after authenticating the service authorization code.

In the present disclosure, generated service information is sent to the service authorization terminal by means of the service initiating terminal, the service initiating terminal receives a service authorization code generated by the service authorization terminal by means of computation based on the service information and relevant user information. Then the service initiating terminal generates service authentication information according to the service information and the service authorization code, and uploads the service authentication information to a server-side so that the server-side processes the service after authenticating the service authorization code. In the present disclosure, because the authentication of service information is uniformly conducted by the server-side, to some services with higher security, a trusted service environment may no longer be needed to be simulated on the service authorization terminal and the service initiating terminal, thereby benefiting service promotion.

When the technical solution of the present disclosure is applied to an offline payment service, it may be implemented that, in the process of payment, a trusted service environment may no longer be needed to be simulated on a merchant's terminal and a user terminal by setting up an extra security module. The merchant's terminal and the user terminal may finish the payment service by using a general terminal, thereby promoting the offline payment service.

DESCRIPTION OF THE EMBODIMENTS

In some embodiments, the present disclosure provides a service authentication method, where the method includes sending generated service information to a service authorization terminal, and receiving a service authorization code corresponding to the service information sent by the service authorization terminal, wherein the service authorization code is generated by the service authorization terminal by means of computation based on the service information and relevant user information. The method also includes generating service authentication information according to the service information and the service authorization code, and uploading the service authentication information to a server-side so that the server-side processes the service after authenticating the service authorization code.

In some embodiments, sending generated service information to a service authorization terminal includes sending the generated service information to the service authorization terminal based on a preset NFC module.

In some embodiments, the method further includes digitally signing the service authentication information before uploading the service authentication information to a server-side so that the server-side continues authenticating the service authentication information after authenticating the signature.

In some embodiments, the method further includes receiving a notification message sent by the server-side after finishing processing the service, wherein the notification message is configured to give notice that the service has been processed by the server-side.

In some embodiments, the service includes an offline payment service, the service information includes order information corresponding to the offline payment service, and the service authentication information includes transaction information corresponding to the offline payment service.

In some embodiments, the present disclosure further provides a service authentication method, where the method includes receiving service information sent by a service initiating terminal, generating a corresponding service authorization code by computing the service information and relevant user information according to a preset algorithm, and sending the service authorization code to the service initiating terminal so that the service initiating terminal generates service authentication information according to the service information and the service authorization code, and uploading the service authentication information to a server-side so that the server-side processes the service after authenticating the service authorization code.

In some embodiments, receiving service information sent by a service initiating terminal includes receiving, based on a preset NFC module, the service information sent by the service initiating terminal.

In some embodiments, the method further includes, before generating a corresponding service authorization code by computing the service information and relevant user information according to a preset algorithm, conducting a service authorization on the service information. The conducting a service authorization on the service information includes acquiring service authorization information input by a user, wherein the service authorization information includes a password or fingerprint configured to conduct a service authorization, matching the acquired service authorization information with locally stored service authorization information, and determining authorization of the service information to be completed when the acquired service authorization information matches with the locally stored service authorization information.

In some embodiments, the method further includes receiving a notification message sent by the server-side after finishing processing the service, wherein the notification message is configured to give notice that the service has been processed by the server-side.

In some embodiments, the service authorization code is valid within a preset time length.

In some embodiments, the service includes an offline payment service, the service information includes order information corresponding to the offline payment service, and the service authentication information includes transaction information corresponding to the offline payment service.

In some embodiments, the present disclosure further provides a service authentication apparatus, where the apparatus includes a first sending module configured to send generated service information to a service authorization terminal, and a first receiving module configured to receive a service authorization code corresponding to the service information sent by the service authorization terminal, wherein the service authorization code is generated by the service authorization terminal by means of computation based on the service information and relevant user information. The apparatus also includes a first generating module configured to generate service authentication information according to the service information and the service authorization code, and upload the service authentication information to a server-side so that the server-side processes the service after authenticating the service authorization code.

In some embodiments, the first sending module is specifically configured to send the generated service information to the service authorization terminal based on a preset NFC module.

In some embodiments, the apparatus further includes a signature module configured to digitally sign, before uploading the service authentication information to a server-side, the service authentication information so that the server-side continues authenticating the service authentication information after authenticating the signature.

In some embodiments, the first receiving module is further configured to receive a notification message sent by the server-side after finishing processing the service, wherein the notification message is configured to give notice that the service has been processed by the server-side.

In some embodiments, the service includes an offline payment service, the service information includes order information corresponding to the offline payment service, and the service authentication information includes transaction information corresponding to the offline payment service.

In some embodiments, the present disclosure further provides a service authentication apparatus, where the apparatus includes a second receiving module configured to receive service information sent by a service initiating terminal, a second generating module configured to generate a corresponding service authorization code by computing the service information and relevant user information according to a preset algorithm, and a second sending module configured to send the service authorization code to the service initiating terminal by means of an NFC module so that the service initiating terminal generates service authentication information according to the service information and the service authorization code, and upload the service authentication information to a server-side so that the server-side processes the service after authenticating the service authorization code.

In some embodiments, the second receiving module is specifically configured to receive, based on a preset NFC module, the service information sent by the service initiating terminal.

In some embodiments, the apparatus further includes an authorization module configured to conduct, before generating a corresponding service authorization code by computing the service information and relevant user information according to a preset algorithm, a service authorization on the service information. The authorization module is specifically configured to acquire service authorization information input by a user, wherein the service authorization information includes a password or fingerprint configured to conduct a service authorization, match the acquired service authorization information with locally stored service authorization information, and determine authorization of the service information to be finished when the acquired service authorization information matches with the locally stored service authorization information.

In some embodiments, the second receiving module is specifically configured to receive a notification message sent by the server-side after finishing processing the service, wherein the notification message is configured to give notice that the service has been processed by the server-side.

In some embodiments, the service authorization code is valid within a preset time length.

In some embodiments, the service includes an offline payment service, the service information includes order information corresponding to the offline payment service, and the service authentication information includes transaction information corresponding to the offline payment service.

In the present disclosure, generated service information is sent to the service authorization terminal by means of the service initiating terminal, it receives a service authorization code generated by the service authorization terminal by means of computation based on the service information and relevant user information. The service initiating terminal generates service authentication information according to the service information and the service authorization code, and uploads the service authentication information to a server-side so that the server-side processes the service after authenticating the service authorization code. In the present disclosure, because the authentication of service information is uniformly conducted by the server-side, to some services with higher security, a trusted service environment may no longer be needed to be simulated on the service authorization terminal and the service initiating terminal, thereby benefiting service promotion.

When the technical solution of the present disclosure is applied to an offline payment service, it may be implemented that, in the process of payment, a trusted service environment may no longer be needed to be simulated on a merchant's terminal and a user terminal by setting up an extra security module. The merchant's terminal and the user terminal may finish the payment service by using a general terminal, thereby benefiting payment service promotion.

The following describes the present disclosure with reference to embodiments and specific application scenarios.

Figure 1:
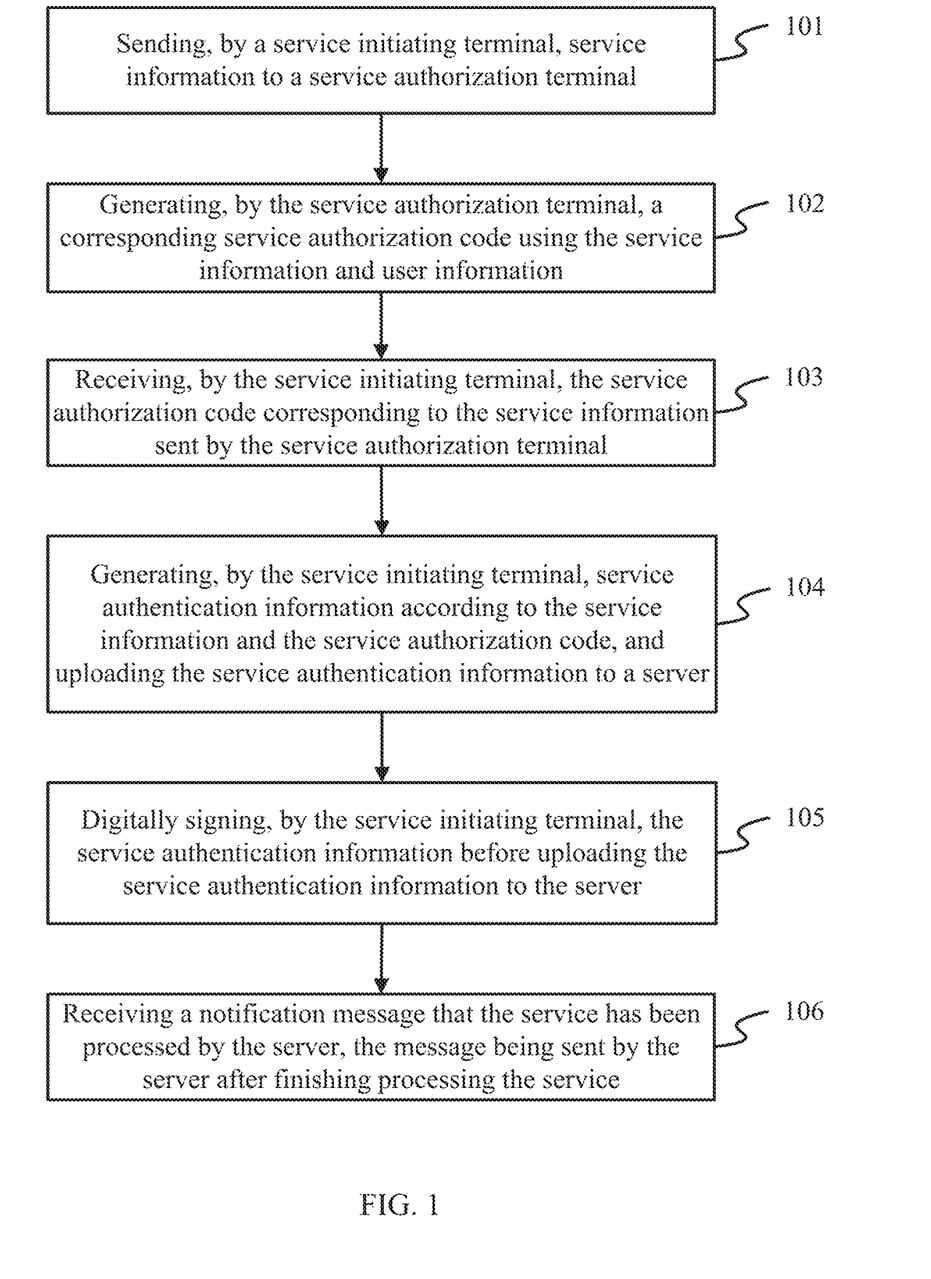
FIG. 1 is a flow diagram of a service authentication method according to some embodiments of the present disclosure.

Referring to FIG. 1, which shows a service authentication method according to some embodiments of the present disclosure, a host for executing the method may be a terminal and a server-side, wherein the terminal may include a service initiating terminal and a service authorization terminal. The terminal and the server-side cooperate with each other to perform the following steps.

In Step 101, the service initiating terminal sends the generated service information to the service authorization terminal.

In Step 102, the service authorization terminal generates a corresponding service authorization code by computing the service information and relevant user information according to a preset algorithm.

In Step 103, the service authorization terminal sends the service authorization code to the service initiating terminal.

In Step 104, the service initiating terminal generates service authentication information according to the service information and the service authorization code, and uploads the service authentication information to a server-side so that the server-side processes the service after authenticating the service authorization code.

By the above steps, as a service initiator, a first user may initiate a service by means of the service initiating terminal. As a service authorizer, a second user may authorize the service initiated by the first user by means of the service authorization terminal. For example, in an application scenario of offline payment, the first user may be a merchant who initiates a payment order by means of a merchant's terminal (for example, a POS machine), and the second user may be a buyer who pays by means of a buyer's terminal (for example, a mobile phone terminal), according to the payment order initiated by the merchant.

When the first user initiates a service by means of the service initiating terminal, the service initiating terminal may generate corresponding service information according to information inputted by the first user, and then send the generated service information to the service authorization terminal.

When the first user sends the service information to the service authorization terminal, this may be conducted by means of an NFC module disposed in the terminal in advance. For example, after the first user initiates a service by means of the service initiating terminal, the second user may bring the service authorization terminal close to the service initiating terminal. When the distance between both reaches a recognition distance (for example, 10 cm) of the NFC module, the service initiating terminal may be triggered to transmit the service information of the service to the service authorization terminal via a wireless channel of the NFC module.

In some embodiments, when the service authorization terminal receives the service information sent by the service initiating terminal, the second user may first conduct a service authorization on the received service information by means of the service authorization terminal. When the service authorization terminal conducts a service authorization on the received service information, this may be implemented by locally authenticating the acquired service authorization information input by the second user. For example, in implementation, the service authorization information may include a password or fingerprint input by the second user for conducting a service authorization.

When the service authorization terminal conducts a service authorization on the received service information, the service authorization terminal may acquire the password or fingerprint input by the second user for conducting the authorization, and then locally authenticates the password or fingerprint by matching the acquired password or fingerprint with a locally stored password or fingerprint. When the acquired password or fingerprint matches with the locally stored password or fingerprint, the acquired password or fingerprint is authenticated, and the service authorization terminal may determine the authorization of the service information to be completed. By this means, it may be avoided that other users instead of the second user process a service initiated by the service initiating terminal, thereby improving the service security.

After the service information authorization is completed, the service authorization terminal may generate a corresponding service authorization code by computing the service information and relevant user information according to a preset algorithm, and then send the service authorization code to the service initiating terminal by means of the NFC module. When the service authorization terminal computes the service authorization code, the relevant user information adopted may include terminal information of the service authorization terminal and user information of the second user, or the like, and the preset algorithm adopted may include a preset signature or an encryption algorithm, and so on. The type of the algorithm is not particularly limited in the present disclosure, and may be selected according to actual demand.

In addition, in order to improve security, when the service authorization terminal computes the service authorization code according to the preset algorithm, a valid time may be set up for the computed service authorization code, and the service authorization code may be normally authenticated within the valid time. For example, when the service authorization terminal computes the service authorization code, a timestamp may be introduced into the computed service authorization code. A valid time is set up for the service authorization code, and then the valid time set up by the service authorization terminal is uploaded to the server-side by the service initiating terminal. When the service authorization code is uploaded to the server-side for authentication, the server-side may check the timestamp in the service authorization code to confirm whether the service authorization code is valid or not. If the current time is beyond a valid duration, this indicates that the service authorization code is invalid, and the server-side may directly discard the service authorization code without authentication. By this means, a risk of disclosure of the service authorization code may be effectively avoided.

After receiving the service authorization code sent by the service authorization terminal, the service initiating terminal may generate service authentication information according to the service information and the service authorization code, and upload the service authentication information to the server-side so that the server-side authenticates the service authorization code. In order to ensure the security in the process of transmission of the service authorization information, before uploading the service authentication information to the server-side, the service authorization terminal may also conduct a signature on the service authentication information, and then upload the signed service authentication information to the server-side. It is to be understood that when the service authorization terminal sends the service authorization code to the service initiating terminal, it may also send user account information and so on. Thus the service initiating terminal sends the authorization information along with the user account information to the server-side, so that the server-side may determine the user account information to conduct corresponding service processing.

For example, the service initiating terminal may directly assemble the service information and the service authorization code, take the assembled information as the service authentication information, then conduct a signature processing on the service authentication information according to a preset signature algorithm, and then upload the signed service authentication information to the server-side. The server-side then respectively authenticates the signature and the service authentication information.

In some embodiments, when the server-side authenticates the received service authentication information, the server-side may first authenticate the signature of the service authentication information. For example, the server-side may use the same signature algorithm to parse the signature, and then authenticate the validity of the signature according to the parsing result.

After the signature is authenticated, the server-side may further authenticate the service authorization code in the service authentication information. For example, the server-side may check a valid timestamp in the service authorization code to determine whether the service authorization code is invalid or not. When the service authorization code is valid, the server-side may use the same algorithm as used by the service authorization terminal for computing the service authorization code to compute the service information and the relevant user information, and then judge whether the computed service authorization code is consistent with a service authentication code in the service authentication information. The service authentication information is used to authenticate the service authentication code in the service authorization information. In order to ensure the consistency of the algorithm used by the server-side and the service authorization terminal for computing the service authorization code, the algorithm may be uniformly issued by the server-side and updated in real time, or the algorithm may be separately configured on the service authorization terminal and the server-side in advance.

After both the signature in the service authentication information and the service authentication information are authenticated, the server-side may directly process the service locally because the service has been authorized by the service authorization terminal. It may send separately, after the service is successfully processed, a notification message to the service initiating terminal and the service authorization terminal to inform both that the service has been finished processing. Of course, if either the signature in the service authentication information or the service authentication code fails in authentication, the server-side may separately send a notification message to the service initiating terminal and the service authorization terminal to inform both that the service fails in processing.

In practical application, the technical solutions in the foregoing embodiments may be applied to scenarios of offline payment service. The following makes a description by taking an example in which the technical solutions in the foregoing embodiments are applied to scenarios of offline payment service.

In the application of traditional offline payment, a user may simulate, on a buyer's terminal, a medium of payment (for example, a bank card or an E-wallet and so on) by means of a specific application program, and then interact with a merchant's terminal (for example, a POS machine) by means of an NFC module on the buyer's terminal to finish the payment process.

Because payment is a service with higher security, in order to shield a potential risk in the payment process, generally terminals of both sides need to provide a trusted execution environment in the process of offline payment.

On the part of the merchant, the merchant's terminal generally is a dedicated device having higher security such as a POS machine or the like. On the part of the buyer, when the medium of payment is simulated on the buyer's terminal by means of the specific application program, generally an SE (Secure Element) needs to be mounted on the buyer's terminal. By means of a security algorithm provided by the SE, a trusted execution environment (TEE) is simulated on the buyer's terminal.

For example, an example is taken in which the medium of payment is a bank card, after the merchant's terminal generates an order, the buyer may finish the action of "swiping card" by bringing the buyer's terminal, on which the NFC module is disposed, close to the merchant's terminal so that the merchant's terminal is triggered to send a consumption instruction to the buyer's terminal. After receiving the consumption instruction, the buyer's terminal processes the consumption instruction and generates an MAC1 configured to authenticate the validity of the simulated bank card. After authenticating the MAC1 in the TEE, the merchant's terminal processes the order and generates an MAC2 configured to authenticate the validity of the merchant. Under the security protection provided by the SE, the buyer's terminal authenticates the MAC2, if the authentication is passed, the transaction succeeds and then informs the server-side to transfer.

As can be seen, in the traditional implementation, in order to ensure payment security, there are certain hardware requirements for both the buyer's terminal and the merchant's terminal, and it is unable to use a general terminal having an NFC module. For example, the merchant must use a POS machine having higher security, and the buyer must use an SE terminal provided with an SE, thereby it is quite unbeneficial to mobile payment service promotion.

In order to solve the foregoing problem, by means of changing the traditional offline payment process and shielding a sensitive step in the offline payment process, authentication of payment in the offline payment process is uniformly executed by the server-side, neither the merchant's terminal nor the buyer's terminal needs to respectively authenticate the validity of each other locally. By this means, neither the merchant's terminal nor the buyer's terminal needs to be additionally provided with an SE to provide protection for the payment process because the sensitive step in the payment process has been shielded. Therefore, the merchant's terminal and the buyer's terminal may use a general terminal having an NFC module, thereby benefiting mobile payment service promotion.

When the technical solutions in the foregoing embodiments are applied to scenarios of payment service, the service may be an offline payment service, the first user may be the merchant, and the second user may be the buyer, the service information may be order information corresponding to the offline payment service, the service authentication information may be transaction information corresponding to the offline payment service, and the service authorization terminal and the service initiating terminal may be general terminal devices having an NFC module, for example, a smart mobile phone. The server-side may be a server for providing a payment service for the buyer and the merchant, a server cluster or a cloud platform built based on the server cluster. For example, the server-side may be an Alipay platform, or a bank server cooperating with the Alipay platform.

A description is made below by taking an example in which both the service authorization terminal and the service initiating terminal are smart mobile phones. Of course, the description in which both the service authorization terminal and the service initiating terminal are smart mobile phones is exemplary only, and the disclosure is not limited to this example. In implementation, the service authorization terminal and the service initiating terminal may also use other types of general mobile terminals having an NFC module.

Figure 2:
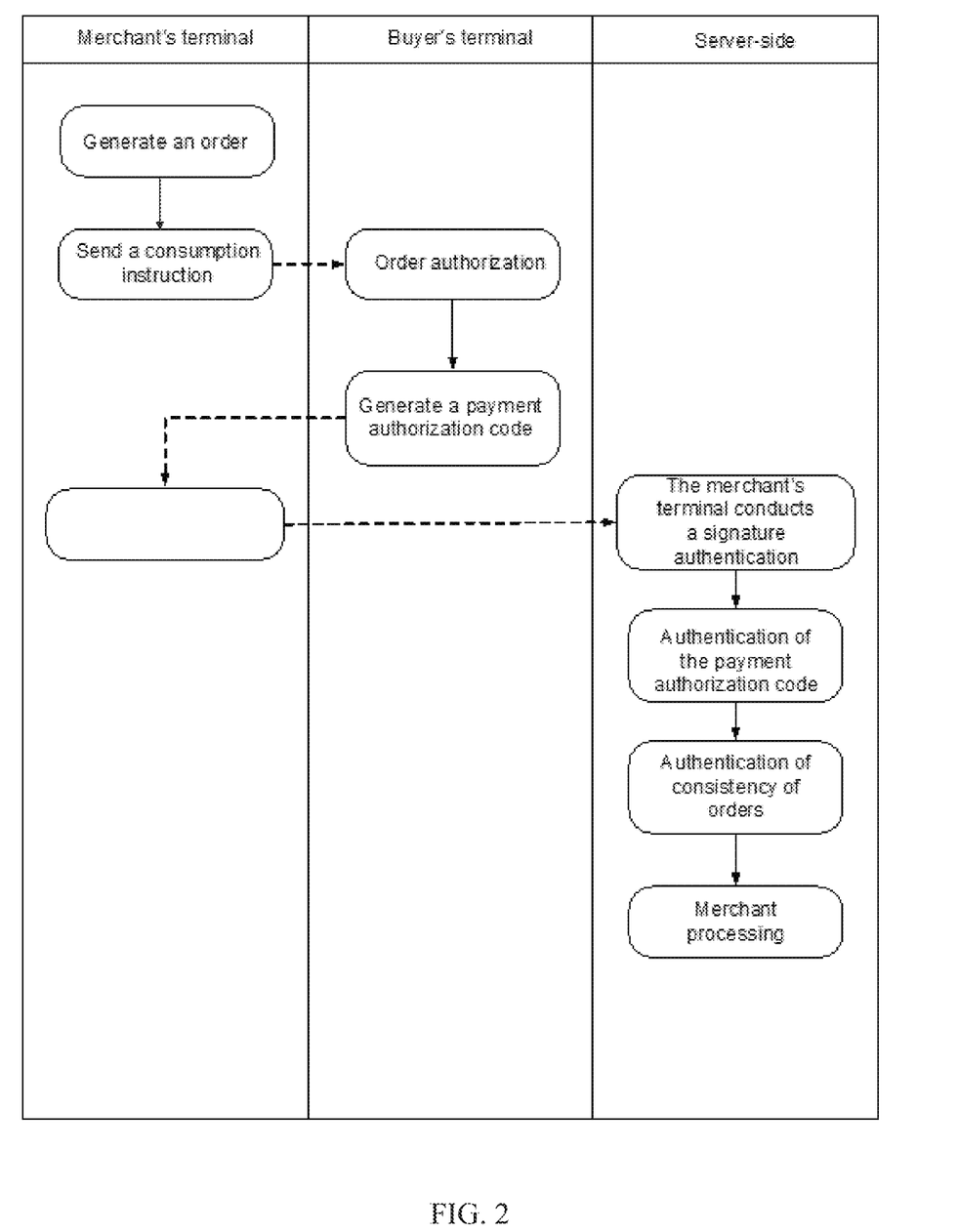
FIG. 2 is a schematic interaction diagram of a merchant's terminal and a buyer's terminal according to some embodiments of the present disclosure.

Reference is now made to FIG. 2, which is a schematic interaction diagram of the merchant's terminal and the buyer's terminal shown according to some embodiments of the present disclosure.

As shown in FIG. 2, in the process of offline payment made by the buyer's terminal to the merchant's terminal, the merchant may generate an order on the merchant's mobile phone client according to the buyer's buying demands, and then the merchant's mobile phone client may send a corresponding consumption instruction to the buyer's mobile phone client, wherein the consumption instruction may include order information corresponding to the order, for example, information relating to the type, amount and quantity of merchandises purchased by the buyer.

After the buyer's mobile phone client receives the consumption instruction sent by the merchant's mobile phone client, the buyer may view the order information on the buyer's mobile phone client and confirm the order information. After confirming the order information, the buyer may authorize the order by inputting a preset payment password or fingerprint on the buyer's mobile phone client. After acquiring the payment password or fingerprint input by the buyer, the buyer's mobile phone client may authenticate the locally received payment password or fingerprint, generate an one-off payment authorization code, when the authentication is passed, according to the order information, the buyer information and the buyer's mobile phone information, and set up valid time for the payment authorization code, which is valid within the valid time.

After generating the payment authorization code, the buyer's mobile phone client may send the payment authorization code to the merchant's mobile phone client by means of the NFC module. After receiving the payment authorization code, the merchant's mobile phone client may assemble the order information and the payment authorization code into corresponding transaction information, then sign the transaction information according to the preset signature algorithm, and then upload the signed transaction information to the server-side.

After receiving the transaction information sent by the merchant's mobile phone client, the server-side first authenticates the signature of the transaction information. If the signature authentication fails, the server-side directly notifies the buyer's mobile phone client and the merchant's mobile phone client of the failed transaction. If the signature authentication fails, the server-side may further authenticate the payment authorization code in the transaction information, and directly notify the buyer's mobile phone client and the merchant's mobile phone client of the failed transaction if the authentication of the payment authorization code fails. If the authentication of the payment authorization code succeeds, the server-side may further authenticate whether the order corresponding to the payment authorization code is consistent with the order initiated by the merchant. The order authorization succeeds if the two orders are consistent, and the server-side may directly complete the payment locally and transfer the sum of money from the buyer's account to the merchant's account. After the payment is completed, the server-side conducts a merchant processing on the order, and respectively sends a notification message indicating successful payment to the buyer's mobile phone client and the merchant's mobile phone client. After the buyer's mobile phone client and the merchant's mobile phone client receive the notification message, the payment of this order is completed.

As can been seen in the foregoing embodiments of the present disclosure, generated service information is sent to the service authorization terminal by means of the service initiating terminal, it receives a service authorization code generated by the service authorization terminal by means of computation based on the service information and relevant user information. The service initiating terminal generates service authentication information according to the service information and the service authorization code, and uploads the service authentication information to a server-side so that the server-side processes the service after authenticating the service authorization code. In the present disclosure, because the authentication of service information is uniformly conducted by the server-side, to some services with higher security, a trusted service environment may no longer be needed to be simulated on the service authorization terminal and the service initiating terminal, thereby benefiting service promotion.

When the technical solution of the present disclosure is applied to an offline payment service, it may be implemented that, in the process of payment, a trusted service environment may no longer be needed to be simulated on a merchant's terminal and a user terminal by setting up an extra security module. The merchant's terminal and the user terminal may finish the payment service by using a general terminal, thereby benefiting payment service promotion.

Corresponding to the embodiments of the foregoing method, the present disclosure further provides embodiments of the apparatus.

Figure 3:
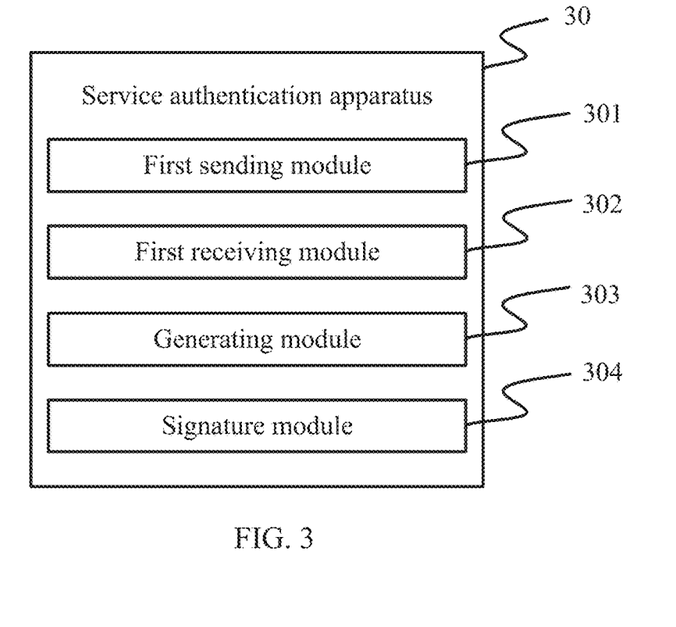
FIG. 3 is a logic block diagram of a service authentication apparatus according to some embodiments of the present disclosure.
Figure 4:
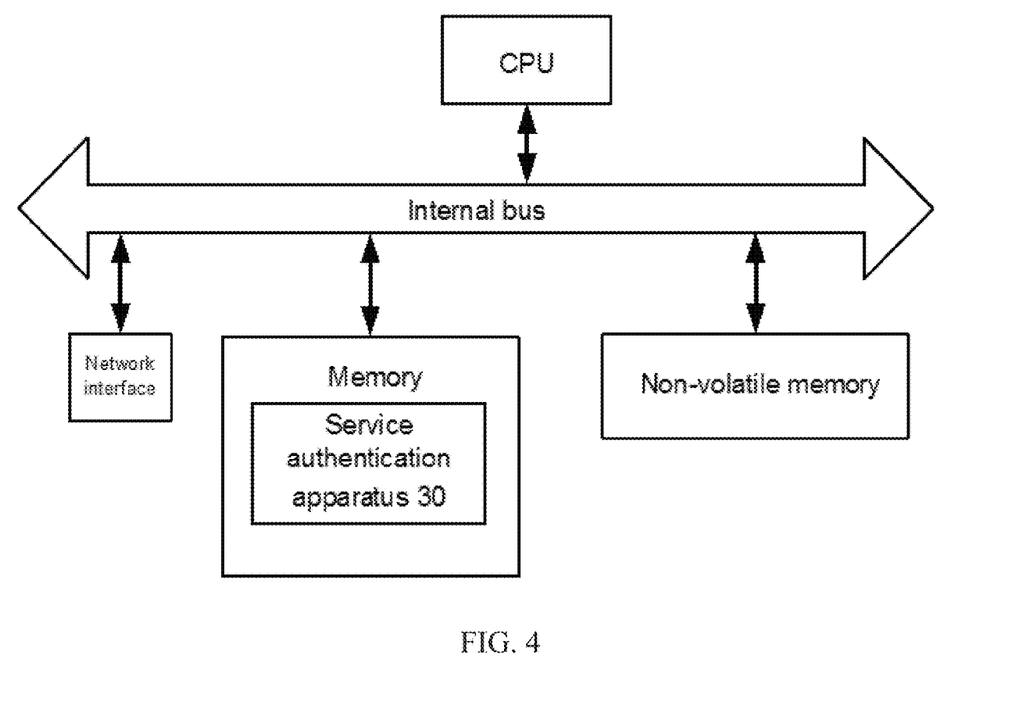
FIG. 4 is a hardware structure diagram of a terminal for bearing the service authentication apparatus according to some embodiments of the present disclosure.

Referring to FIG. 3, the present disclosure provides a service authentication apparatus 30 applicable to a terminal, which may be a service initiating terminal. Referring to FIG. 4 as an example of an embodiment of the service authentication apparatus 30, a hardware architecture involved with bearing the terminal of the service authentication apparatus 30 generally includes a CPU, a memory, a non-volatile memory, a network interface, and an internal bus, and the like. Taking software implementation as an example, the service authentication apparatus 30 usually may be interpreted as a logic device formed by a computer program loaded in the memory that combines hardware and software after CPU running, and the apparatus 30 includes the following modules 301 through 303 (FIG. 3).

A first sending module 301 is configured to send generated service information to a service authorization terminal.

A first receiving module 302 is configured to receive a service authorization code corresponding to the service information sent by the service authorization terminal, wherein the service authorization code is generated by the service authorization terminal by means of computation based on the service information and relevant user information.

A first generating module 303 is configured to generate service authentication information according to the service information and the service authorization code, and upload the service authentication information to a server-side so that the server-side processes the service after authenticating the service authorization code.

In some embodiments, the first sending module 301 is specifically configured to send the generated service information to the service authorization terminal based on a preset NFC module.

In some embodiments, the apparatus further includes a signature module 304 configured to digitally sign the service authentication information before uploading the service authentication information to a server-side so that the server-side continues authenticating the service authentication information after authenticating the signature.

In some embodiments, the first receiving module 302 is further configured to receive a notification message sent by the server-side after finishing processing the service, wherein the notification message is configured to give notice that the service has been processed by the server-side.

In some embodiments, the service includes an offline payment service, the service information includes order information corresponding to the offline payment service, and the service authentication information includes transaction information corresponding to the offline payment service.

Figure 5:
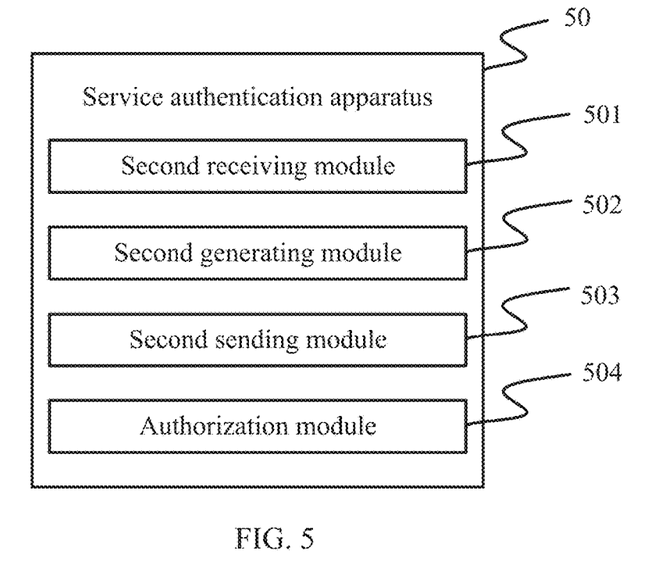
FIG. 5 is a logic block diagram of another service authentication apparatus according to some embodiments of the present disclosure.
Figure 6:
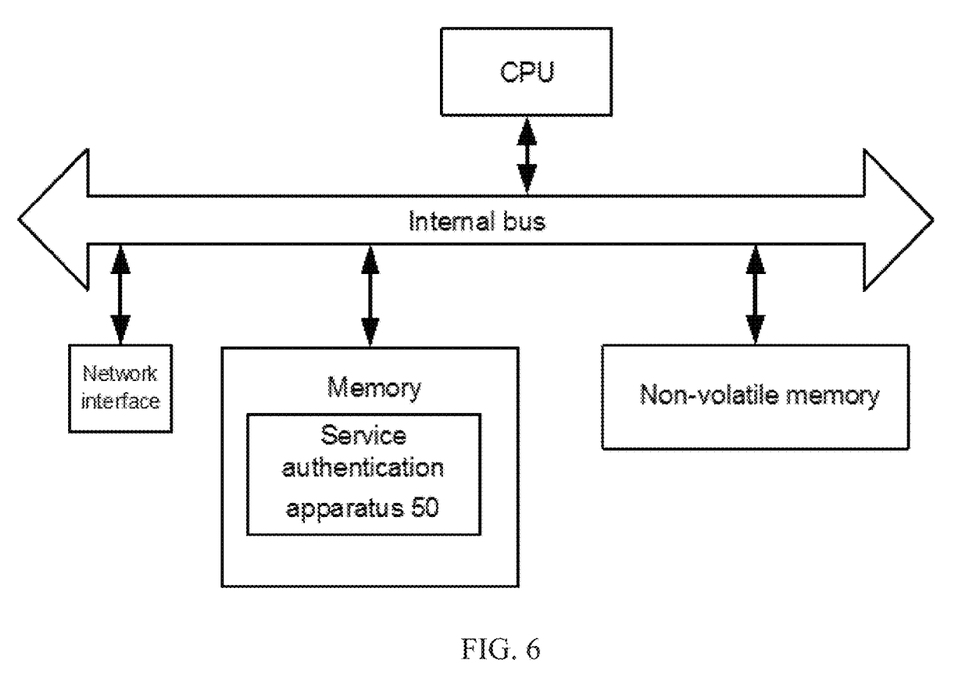
FIG. 6 is a hardware structure diagram of a terminal for bearing another service authentication apparatus according to some embodiments of the present disclosure.

Referring to FIG. 5, the present disclosure provides a service authentication apparatus 50 applicable to a terminal, which may be a service authorization terminal. Referring to FIG. 6 as an example of an embodiment of the service authentication apparatus 50, a hardware architecture involved with bearing the terminal of the service authentication apparatus 50 generally includes a CPU, a memory, a non-volatile memory, a network interface, and an internal bus, or the like. Taking software implementation as an example, the service authentication apparatus 50 usually may be interpreted as a logic device formed by a computer program loaded in the memory that combines hardware and software after CPU running, and the apparatus 50 includes the following modules 501 through 503 (FIG. 5).

A second receiving module 501 is configured to receive service information sent by a service initiating terminal.

A second generating module 502 is configured to generate a corresponding service authorization code by computing the service information and relevant user information according to a preset algorithm.

A second sending module 503 is configured to send the service authorization code to the service initiating terminal by means of an NFC module so that the service initiating terminal generates service authentication information according to the service information and the service authorization code, and upload the service authentication information to a server-side so that the server-side processes the service after authenticating the service authorization code.

In some embodiments, the second receiving module 501 is specifically configured to receive, based on a preset NFC module, the service information sent by the service initiating terminal.

In some embodiments, the apparatus further includes an authorization module 504 configured to conduct, before generating a corresponding service authorization code by computing the service information and relevant user information according to a preset algorithm, a service authorization on the service information. The authorization module 504 is specifically configured to acquire service authorization information input by a user, wherein the service authorization information includes a password or fingerprint configured to conduct a service authorization, match the acquired service authorization information with locally stored service authorization information, and determine authorization of the service information to be finished when the acquired service authorization information matches with the locally stored service authorization information.

In some embodiments, the second receiving module 501 is specifically configured to receive a notification message sent by the server-side after finishing processing the service, wherein the notification message is configured to give notice that the service has been processed by the server-side.

In some embodiments, the service authorization code is valid within a preset time length.

In some embodiments, the service includes an offline payment service, the service information includes order information corresponding to the offline payment service, and the service authentication information includes transaction information corresponding to the offline payment service.

Other embodiments of the present disclosure will be apparent to those skilled in the art from consideration of the specification and practice of the invention disclosed herein. This disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

The embodiments set forth above are only illustrated as preferred embodiments of the present disclosure, and are not intended to limit the present disclosure. All modifications, equivalent substitutions and improvements made within the spirit and principles of the present disclosure shall fall within the protection scope of the present disclosure.

What is claimed is:

1. A method for authentication of a service, the method comprising:
    generating, by a service initiating terminal, service information including order information;
    sending, by the service initiating terminal, the service information to a service authorization terminal;
    receiving, by the service initiating terminal, a service authorization code corresponding to the service information sent by the service authorization terminal in response to an input selection corresponding to the order information entered at the service authorization terminal; and
    generating, by the service initiating terminal, service authentication information according to the service information and the service authorization code, and uploading the service authentication information to a server for processing the service after authenticating the service authorization code.

2. The method according to claim 1, wherein the service authorization code is computed by the service authorization terminal based on user information.

3. The method according to claim 2, wherein the service authorization code is computed by the service authorization terminal based on the user information and the service information.

4. The method according to claim 1, wherein the sending the service information to the service authorization terminal is via a near field communication (NFC) module.

5. The method according to claim 1, further comprising:
    digitally signing, by the service initiating terminal, the service authentication information before uploading the service authentication information to the server, where the server authenticates the service authentication information after authenticating the signature.

6. The method according to claim 1, further comprising:
    receiving a notification message that the service has been processed by the server, the message being sent by the server after finishing processing the service.

7. The method according to claim 1,
    wherein the service includes an offline payment service,
    wherein the service information includes order information corresponding to the offline payment service, and
    wherein the service authentication information includes transaction information corresponding to the offline payment service.

8. A method for authentication of a service, the method comprising:
    receiving, by a service authorization terminal, service information sent by a service initiating terminal, the service information including order information;
    receiving, by the service authorization terminal, an input selection corresponding to the order information;
    in response to the input selection, generating, by the service authorization terminal, a corresponding service authorization code; and
    sending, by the service authorization terminal, the service authorization code to the service initiating terminal,
    wherein the service authentication code allows the service initiating terminal to generate service authentication information according to the service information and the service authorization code, and upload the service authentication information to a server for processing the service after authenticating the service authorization code.

9. The method according to claim 8, wherein the service authorization code is computed by the service authorization terminal based on user information.

10. The method according to claim 9, wherein the service authorization code is computed by the service authorization terminal based on the user information and the service information.

11. The method according to claim 8, wherein the receiving the service information sent by the service initiating terminal comprises is via a near field communication (NFC) module.

12. The method according to claim 8, further comprising:
conducting, by the service authorization terminal, a service authorization on the service information before generating a corresponding service authorization code using the service information and user information according to a preset algorithm, the conducting the service authorization including acquiring a password or a fingerprint;
comparing, by the service authorization terminal, the acquired service authorization information with locally stored service authorization information; and
determining, by the service authorization terminal, the authorization of the service information to be completed when the acquired service authorization information matches the locally stored service authorization information.

13. The method according to claim 8, further comprising:
receiving a notification message that the service has been processed by the server, the message being sent by the server after finishing processing the service.

14. The method according to claim 8, wherein the service authorization code is valid within a preset time length.

15. The method according to claim 8,
wherein the service includes an offline payment service,
wherein the service information includes order information corresponding to the offline payment service, and
wherein the service authentication information includes transaction information corresponding to the offline payment service.

16. An apparatus for authentication of a service, the apparatus comprising:
a processor; and
a non-transitory memory storing computer-executable instructions that, when executed by the processor, cause the apparatus to:
generate, by a service initiating terminal, service information including order information;
send, by the service initiating terminal, generated service information to a service authorization terminal;
receive, by the service initiating terminal, a service authorization code corresponding to the service information sent by the service authorization terminal in response to an input selection corresponding to the order information entered at the service authorization terminal; and
generate service authentication information according to the service information and the service authorization code, and upload the service authentication information to a server for processing the service after authenticating the service authorization code.

17. The apparatus according to claim 16, wherein the service authorization code is computed by the service authorization terminal based on user information.

18. The apparatus according to claim 17, wherein the service authorization code is computed by the service authorization terminal based on the user information and the service information.

19. The apparatus according to claim 16, wherein the instruction to send generated service information further causes the apparatus to send the generated service information to the service authorization terminal via a near field communication (NFC) module.

20. The apparatus according to claim 16, wherein the instructions further cause the apparatus to
digitally sign, before the instruction to generate and upload the service authentication information to the server, the service authentication information, where the server authenticates the service authentication information after authenticating the signature.

21. The apparatus according to claim 16, wherein the instruction to receive a service authorization code further causes the apparatus to:
receive a notification message that the service has been processed by the server, the message being sent by the server after finishing processing the service.

22. The apparatus according to claim 16,
wherein the service includes an offline payment service,
wherein the service information includes order information corresponding to the offline payment service, and
wherein the service authentication information includes transaction information corresponding to the offline payment service.

23. An apparatus for authentication of a service, the apparatus comprising:
a processor; and
a non-transitory memory storing computer-executable instructions that, when executed by the processor, cause the apparatus to:
receive, by a service authorization terminal, service information sent by a service initiating terminal, the service information including order information;
receive, by the service authorization terminal, an input selection corresponding to the order information; and
in response to the input selection, send, by the service authorization terminal, the service authorization code to the service initiating terminal via a near field communication (NFC) module, the service authorization code allowing the service initiating terminal to generate service authentication information according to the service information and the service authorization code, and upload the service authentication information to a server for processing the service after authenticating the service authorization code.

24. The apparatus according to claim 23, wherein the service authorization code is computed by the service authorization terminal based on user information.

25. The apparatus according to claim 24, wherein the service authorization code is computed by the service authorization terminal based on the user information and the service information.

26. The apparatus according to claim 23, wherein the instruction to receive service information further causes the apparatus to:
receive the service information sent by the service initiating terminal via the NFC module.

27. The apparatus according to claim 23, wherein the instructions further cause the apparatus to
authorize the service information before the instruction to generate a corresponding service authorization code,
wherein the instruction to authorize further causes the apparatus to:
acquire service authorization information for conducting a service authorization, the service authorization information including a password or a fingerprint;
compare the acquired service authorization information with locally stored service authorization information; and
determine authorization of the service information to be completed when the acquired service authorization information matches with the locally stored service authorization information.

28. The apparatus according to claim 23, wherein the instruction to receive service information further causes the apparatus to:
 receive a notification message that the service has been processed by the server, the message being sent by the server after finishing processing the service.

29. The apparatus according to claim 23, wherein the service authorization code is valid within a preset time length.

30. The apparatus according to claim 23,
 wherein the service includes an offline payment service,
 wherein the service information includes order information corresponding to the offline payment service, and
 wherein the service authentication information includes transaction information corresponding to the offline payment service.

* * * * *